United States Patent [19]

Kawamoto

[11] Patent Number: 4,756,202
[45] Date of Patent: Jul. 12, 1988

[54] TRANSMISSION GEARING

[75] Inventor: Yoji Kawamoto, Hikone, Japan

[73] Assignee: Matsushita Electric Works, Ltd., Osaka, Japan

[21] Appl. No.: 13,043

[22] Filed: Feb. 10, 1987

[30] Foreign Application Priority Data

Feb. 21, 1986 [JP] Japan .................. 61-38044

[51] Int. Cl.⁴ .................. A46B 13/02; F16H 21/00
[52] U.S. Cl. .................. 74/23; 74/810; 74/571 R; 15/22 R
[58] Field of Search .................. 74/22 R, 22 A, 23, 24, 74/571 R, 571 L, 571 M, 600, 810, 835, 836, 837; 15/22 R, 22 A; 310/50, 80

[56] References Cited

U.S. PATENT DOCUMENTS

| | | | |
|---|---|---|---|
| 2,753,721 | 7/1956 | Latta | 74/571 |
| 3,010,339 | 11/1961 | Brock | 74/571 |
| 3,168,834 | 2/1965 | Smithson | 74/23 |
| 3,379,906 | 4/1968 | Spohr | 15/22 R |
| 3,482,458 | 12/1969 | Bednarski | 74/600 |
| 3,489,936 | 1/1970 | Boyles | 15/22 R |
| 3,524,088 | 8/1970 | Ryckman, Jr. | 310/50 |
| 3,546,501 | 12/1970 | Kircher | 15/22 R |
| 3,562,566 | 2/1971 | Kircher | 15/22 R |
| 4,494,447 | 1/1985 | Sisk | 74/571 R |
| 4,506,400 | 3/1985 | Klein | 15/22 R |

Primary Examiner—Lawrence Staab
Attorney, Agent, or Firm—Burns, Doane, Swecker & Mathis

[57] ABSTRACT

A transmission gearing in which an eccentric cam includes first and second eccentric cam parts and a cam follower has contact faces abutting these eccentric cam parts so that, when a driving source rotates either in normal or reverse direction, the gearing provides as an output one of two different directional motions at the cam follower, with either one of the first and second eccentric cam parts positioned concentric with their pivot shaft without shifting the cam itself in diametral direction in gearing casing. The gearing arrangement is thereby simplified and minimized in required mounting space so as to realize a high compactness of the gearing.

15 Claims, 4 Drawing Sheets

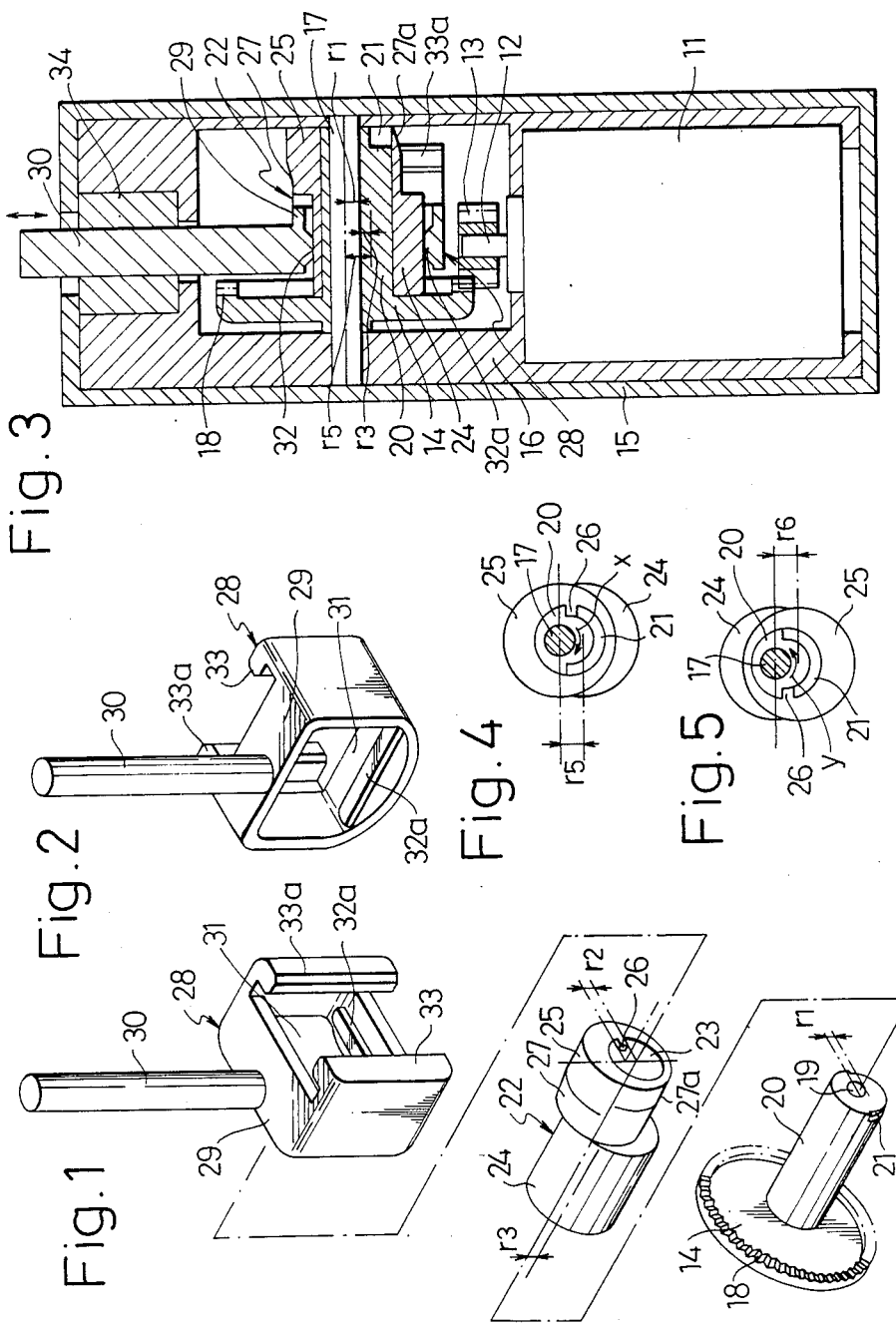

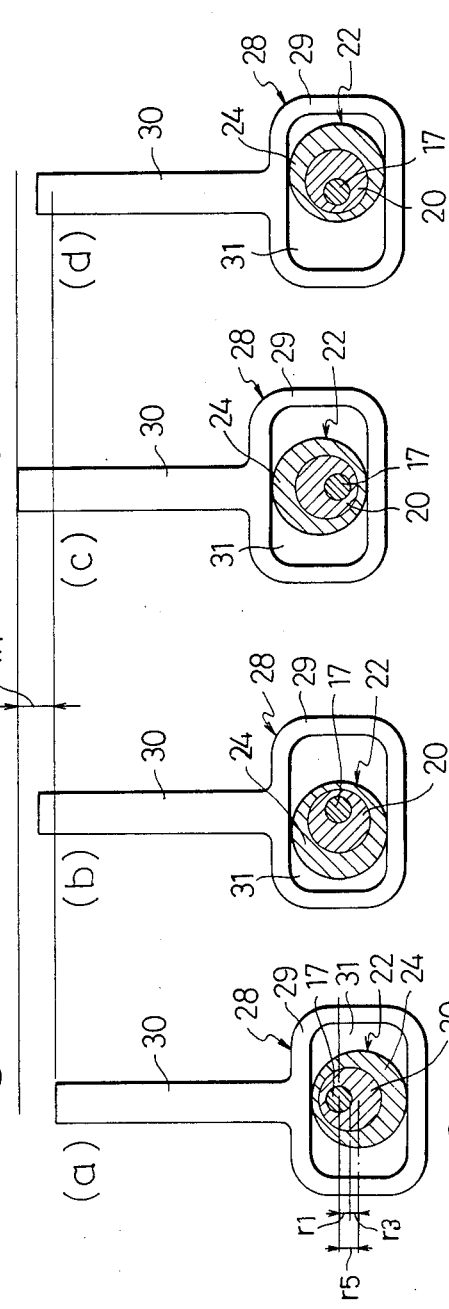
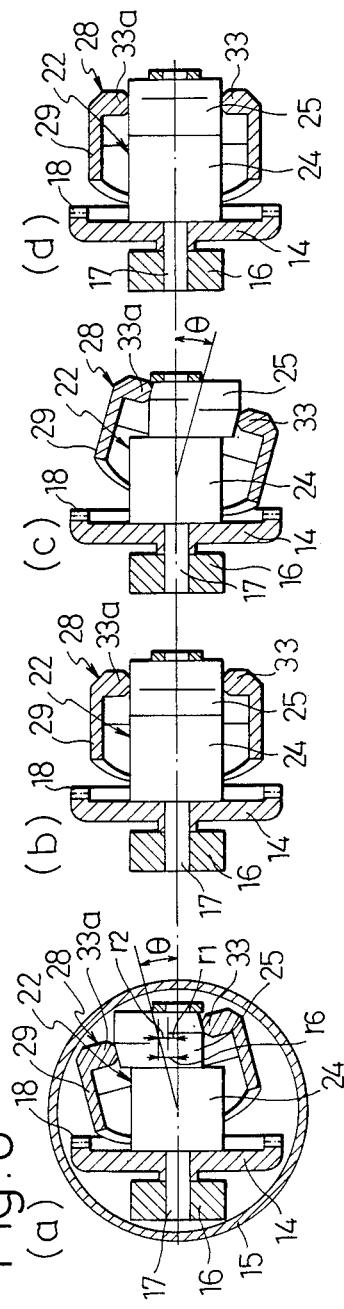
Fig. 6
Fig. 8

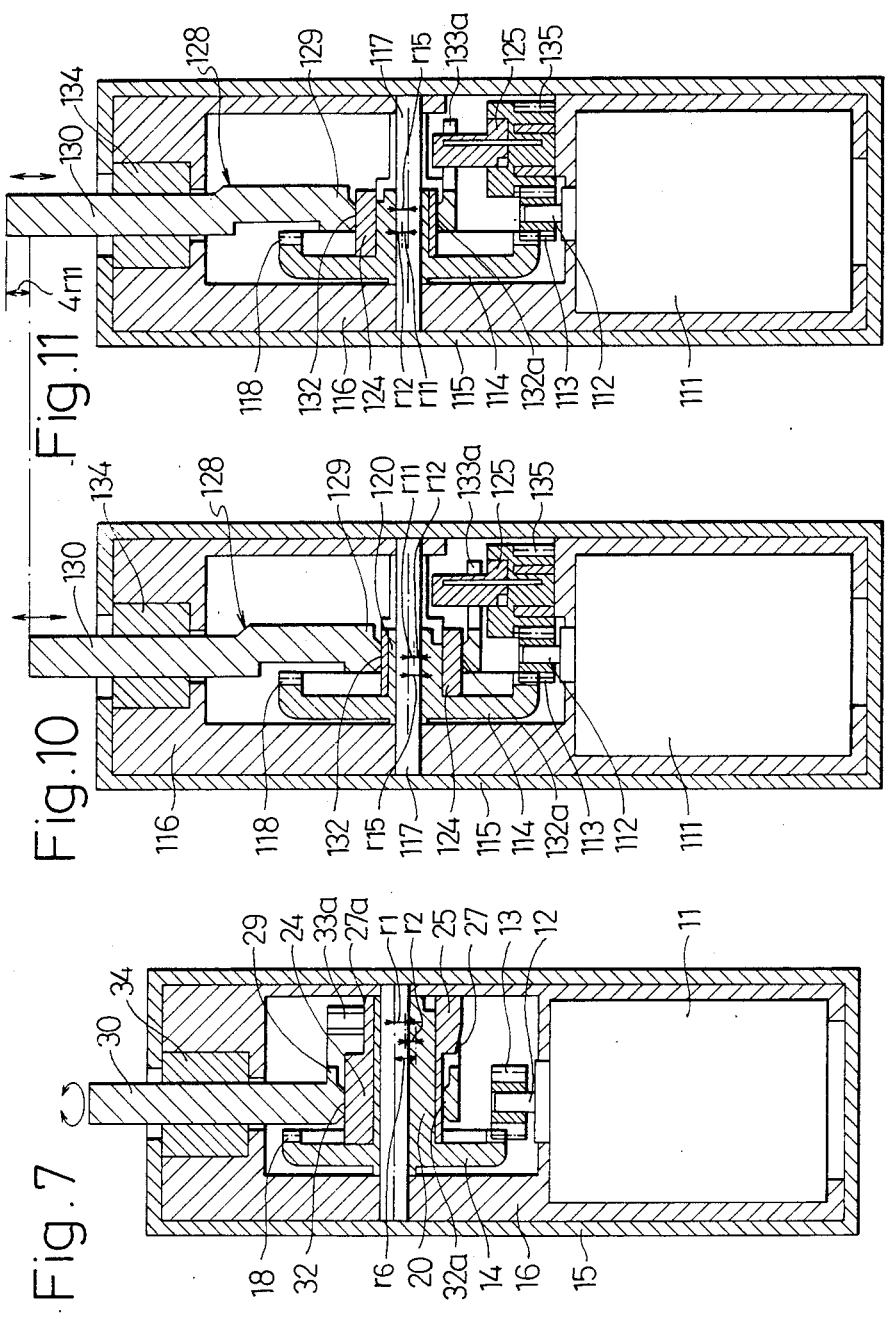

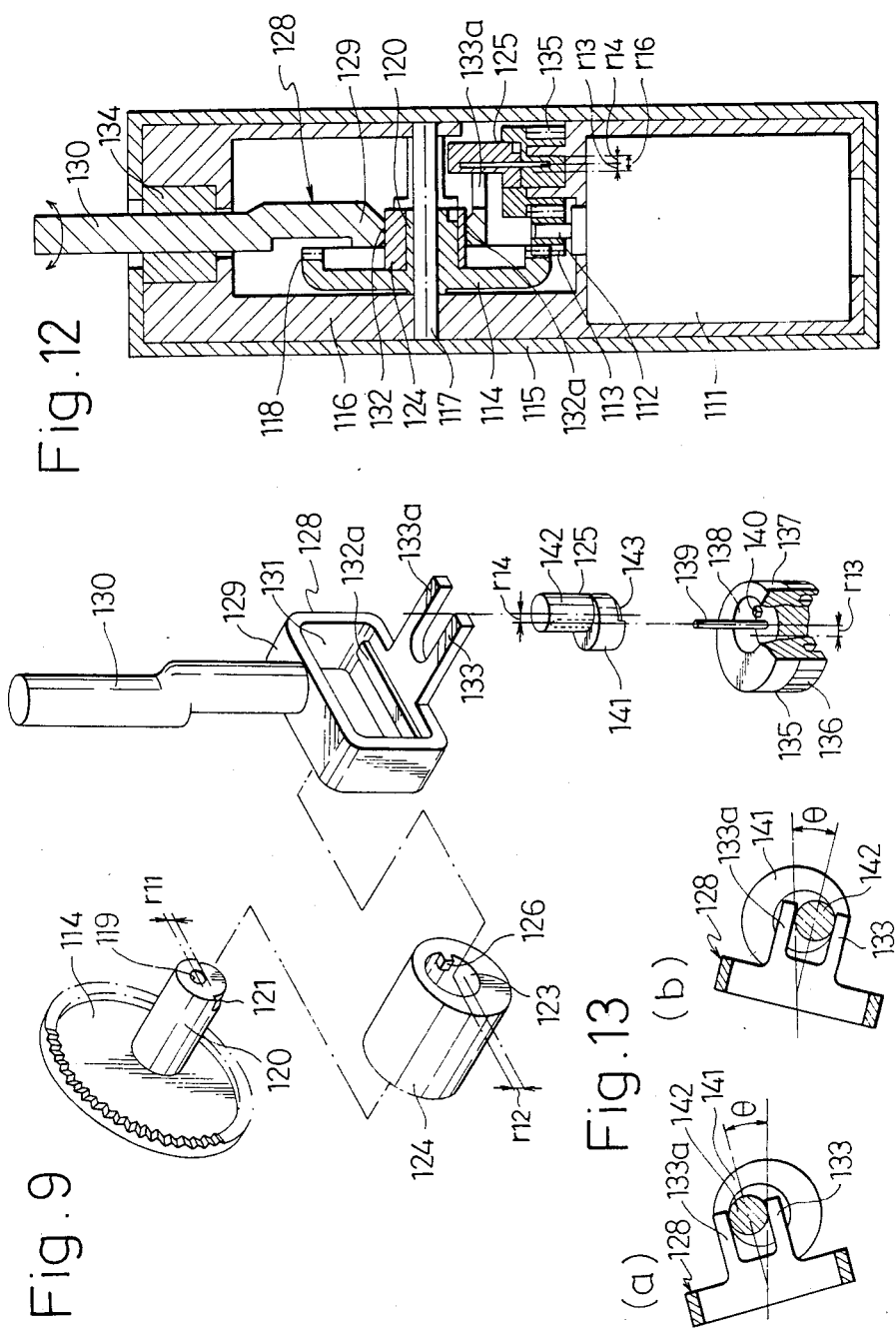

TRANSMISSION GEARING

TECHNICAL BACKGROUND OF THE INVENTION

This invention relates to transmission gearings and, more particularly, to a transmission gearing which can selectively convert a rotational motion to one of two different directional motions, for example, linearly reciprocating and rotatively reciprocating motions.

The transmission gearing of the type referred to is useful when employed in such electrical apparatuses that comprise linearly reciprocating and rotatively reciprocating members which are provided to be selectively used.

DISCLOSURE OF PRIOR ART

This sort of transmission gearing is disclosed in U.S. Pat. No. 3,524,088 to William D. Ryckman, Jr., in which a cam is screwedly mounted to a hub of a face gear meshing with an output shaft of a rotary power source so as to be moved in diametral direction of a casing, and is formed to have three cam regions two of which are made differently eccentric, and a cam follower secured to an output shaft of the gearing is provided with cam following elements which can abut the respective cam regions of the cam for selective change of output motion. According to this transmission gearing, the cam to which a rotational force is transmitted from the power source is selectively shifted in the diametral direction of the casing with respect to the cam follower positioned on the axial line of the casing so as to couple the three different cam regions through the cam following elements of the cam follower to the output shaft, for achieving the linearly and rotatively reciprocating motions.

However, the arrangement of this U.S. patent has involved such a problem that the cam is provided to be diametrally shiftable in the casing, and the entire mechanism for the two different directional motions is caused to require a larger occupation space enough for rendering the entire size of the gearing to become large and required number of constituent members of the mechanism to be large to increase manufacturing costs.

TECHNICAL FIELD OF THE INVENTION

A primary object of the present invention is, therefore, to provide a transmission gearing which can minimize an occupation space of required constituent members for achieving the two different directional motions, and can simplify their arrangement to allow the gearing to be made compact and inexpensive.

According to the present invention, the above object is attained by providing a transmission gearing comprising an eccentric cam generating different directional motions when rotated on a pivot shaft by a reversible driving source, and a cam follower having contact faces brought into contact with the eccentric cam for providing the motions as an output, wherein the eccentric cam includes first and second eccentric cam parts with which the cam follower contacts at the contact faces, and means is provided for positioning either one of the first and second eccentric cam parts of the cam to be concentric with the pivot shaft in response to either one of normal and reverse rotation of the driving source, for obtaining one of the two different directional motions as the output through the cam follower.

Other objects and advantages of the present invention shall be made clear in the following description of the invention detailed with reference to preferred embodiments shown in accompanying drawings.

BRIEF EXPLANATION OF THE DRAWINGS

FIG. 1 is a perspective view as disassembled of major parts of a transmission gearing in an embodiment according to the present invention;

FIG. 2 is a perspective view of a cam follower in the gearing of FIG. 1, as viewed on a side different from FIG. 1;

FIG. 3 shows in a vertically sectioned view the entire structure of the gearing of FIG. 1 with the major parts assembled therein and positioned in one of different operating states;

FIGS. 4 and 5 are diagrams for explaining positional relationship between an eccentric cam and a pivot shaft in the gearing of FIG. 3;

FIGS. 6(a) through 6(d) are diagrams for explaining in sequence the operation of the eccentric cam and cam follower in the gearing of FIG. 3;

FIG. 7 is a vertically sectioned view of the gearing similar to FIG. 3 but shown in the other operating state;

FIGS. 8(a) through 8(d) are diagrams for explaining in sequence the operation of the eccentric cam and cam follower of the gearing in the operational state of FIG. 7;

FIG. 9 shows in a perspective view major parts as disassembled of the gearing in another embodiment according to the present invention;

FIGS. 10 to 12 are vertically sectioned views of the gearing of FIG. 9, respectively in different operational states thereof; and FIGS. 13(a) and 13(b) are diagrams for explaining the different operations of the eccentric cam and cam follower in the gearing of FIG. 9.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIGS. 1 to 8, a transmission device includes a reversible rotary driving source 11 having an output shaft 12 carrying an output pinion 13 fixedly mounted thereto. A face gear 14 meshes with the pinion 13 and is rotatably mounted axially on a pivot shaft 17 secured at both ends to a chassis 16 provided within a casing 15. On the same side having peripheral gear teeth 18, the face gear 14 is provided with an integral eccentric cylindrical part 20 having an axial bore 19 through which the pivot shaft 17 is passed. The axis of this bore 19 is made eccentric by an eccentricity r1 with respect to the axis of the face gear 14 or cylindrical part 20, and the cylindrical part 20 is provided at a remote end edge from the face gear 14 with an arcuate guide recess 21 extending circumferentially by about 180 degrees. Rotatably mounted on the cylindrical part 20 over its full axial length is an eccentric cam 22 which has a through hole 23 the axis of which is eccentric by an eccentricity r2 with respect to that of the face gear 14 or cylindrical part 20.

The eccentric cam 22 comprises a first eccentric cam region 24 disposed adjacent the face gear 14 and a second eccentric cam region 25 remote from the face gear 14, and the first eccentric cam region 24 is eccentric by an eccentricity r3 with respect to the second cam region 25. In this case, the respective eccentricities are made equal to each other, that is, r1=r2=r3. The second eccentric cam region 25 is provided with a stopper 26 projecting radially inward in the through hole 23 at remote end edge from the face gear 14, to be engaged in the guide recess 21 of the cylindrical part 20. The second eccentric cam part 25 is further formed to have tapered surfaces 27 and 27a along its outer periphery, preferably to be symmetrical with each other with respect to a center point of the cam region 25.

A cam follower 28 cooperating with the eccentric cam 22 includes a body 29 and an output shaft 30 erected on the body 29, which body has a generally rectangular, hollow frame shape rounded at its corners and defines therein a cavity 31 in which the eccentric cam 22 is fitted. The body 29 is provided at its upper and lower walls with mutually opposing projections 32 and 32a projecting inward in the cavity 31 and providing a first pair of contact faces for abutting the first eccentric cam part 24 from above and below to generate a linearly reciprocating motion, and with interlocking arms 33 and 33a extending from both lateral side walls of the body 29 in a direction separating from the face gear 14 and then inward to oppose each other and providing a second pair of contact faces for abutting the second eccentric cam region 25 from both lateral sides to generate a rotatively reciprocating motion.

The output shaft 30 of the cam follower 28 is extended upward from the body 29 through a bearing 34 supported in the upper part of the chassis 16 to project at an extended end out of the casing 15.

Explanation will now be made as to the operation of the transmission gearing of the present embodiment. When such a driving source 11 as a reversible motor is rotated in normal direction, its rotational driving force is transmitted through the output shaft 12 and pinion 13 to the face gear 14 to rotate it about the shaft 17 with the eccentric cylindrical part 20 rotated in a direction of an arrow x in FIG. 4, whereby an end wall of the guide recess 21 abuts the stopper 26 of the eccentric cam 22 to rotate it in the direction x. Under this condition of the eccentric cam 22, the foregoing eccentricities are so set that an eccentricity r5 of the axis of the first eccentric cam region 24 with respect to that of the pivot shaft 17 will be here the sum of r1 and r3 (=2r1 because r1=r3), while an eccentricity r6 of the axis of the second eccentric cam region 25 with respect to that of the pivot shaft 17 will be here the difference between r1 and r2, i.e., zero so that the second cam region 25 will be concentrical with the pivot shaft 17. Therefore, when the face gear 14 and eccentric cylindrical part 20 are rotated in the direction x to cause the eccentric cam 22 rotated as interlocked therewith through the stopper 26, the first eccentric cam region 24 is rotated with the eccentricity r5, which rotation is followed by the cam follower 28 in the sequence shown in FIGS. 6(a) to 6(d). More specifically, the first eccentric cam region 24 is rotated in the cavity 31 of the cam follower 28 with the eccentricity r5=2r1, only linear reciprocating component of this eccentric rotation is transmitted through the first pair of contact faces of the projections 32 and 32a to the cam follower 28, and the output shaft 30 axially linearly reciprocates up and down with a stroke 2r1×2=4r1.

When the driving source 11 is rotated in the reverse direction, the eccentric cylindrical part 20 is rotated in a direction of an arrow y in FIG. 5 and the other end wall of the guide recess 21 abuts the stopper 26 to rotate the cam 22 in the direction y, to change over the eccentricity relationship angularly substantially by 180 degrees, whereby the eccentricity r5 of the first eccentric cam region 24 with respect to the axis of the pivot shaft 17 is made to be here the difference between r1 and r3 and thus to be zero, while the eccentricity r6 of the second eccentric cam region 25 is here the sum of r1 and r2, that is, 2r1. With the rotation in the direction y of the face gear 14 and eccentric cylindrical part 20, therefore, the eccentric cam 22 is rotated as interlocked through the stopper 26 with the cylindrical part 20, the second eccentric cam region 25 is now rotated at the eccentricity r6=2r1, which rotation is followed by the cam follower 28 as shown in FIG. 7 in the sequence of FIGS. 8(a) to 8(d). More specifically, the second eccentric cam region 25 is rotated at the eccentricity 2r1 with the second pair of contact faces of the interlocking arms 33 and 33a of the cam follower 28 engaged thereto, only rotative reciprocating component of the eccentric rotation is transmitted through the interlocking arms 33 and 33a to the cam follower 28 during the eccentric rotation with a rotational angle of 2θ as seen in FIG. 8, so that the output shaft 30 rotatively reciprocates in a range of the rotational angle 2θ in circumferential direction of the output shaft 30.

According to the transmission gearing of the foregoing embodiment, either one of the both circumferential end walls of the guide recess 21 of the eccentric cylindrical part 20 abuts the stopper 26 depending on the rotational direction of the driving source 11. In other words, relative interlocking position between the eccentric cylindrical part 20 and the cam 22 is angularly changed over substantially by 180 degrees according to the rotational direction of the driving source 11 so that either one of the first and second eccentric cam regions 24 and 25 of the eccentric cam 22 acts on the cam follower 28. Therefore, it will be appreciated that the gearing of this embodiment is simpler than the known gearing, and further is more compact in the casing 15 since the eccentric cam 22 is not required to be axially shifted in the diametral direction of the casing 15.

The circumferential length of the arcuate guide recess 21 and the position of the stopper 26 may be suitably modified according to relative positional relationship between the bore 19, through-hole 23, first and second eccentric cam regions 24 and 25.

Referring now to FIGS. 9 to 13 of another embodiment of the present invention, its constituent members corresponding and similar to those in the foregoing embodiment are denoted by the same reference numerals but added by 100. In the present embodiment, a face gear 114 meshed with an output pinion 113 of a driving source 111 is integrally provided with an eccentric cylindrical part 120 which has an axial bore 119 through which a pivot shaft 117 is passed, the bore 119 being made eccentric by an eccentricity r11 with respect to the cylindrical part 120 as seen in FIG. 9. The cylindrical part 120 is provided in its extended end edge with an arcuate guide recess 121 which circumferentially extending by about 180 degrees. Rotatably mounted on the eccentric cylindrical part 120 over the full axial length thereof is a first eccentric cam part 124 which has an axial through hole 123 and at its one end a stopper inwardly projected from peripheral wall of the through hole 123, while the through hole 123 itself is made to have an eccentricity r12 with respect to the axis of the cylindrical part 120.

In this embodiment, the output pinion 113 is meshed, on its side opposite to the face gear 114, with peripheral gear teeth 136 of an intermediate gear 135 rotatably supported in a chassis 116, while the gear 135 is provided in upper face of a cylindrical body 137 having the peripheral gear teeth 136 with a circular recess 138 of an axial eccentricity r13 with respect to the axis of the cylindrical part 137. Within this recess 138, there are provided a pivot pin 139 erected in the center of the bottom wall and a stopper 140 projecting from peripheral bottom edge. Seated in the recess 138 is a second eccentric cam part 125, to be rotatable about the pivot pin 139, and this second eccentric cam part 125 is formed to have a lower larger-diametered region 141 received in the recess 138 and an upper smaller-diametered eccentric region 142, the lower region 141 being provided in its bottom edge with an arcuate guide recess 143 extended circumferentially by about 180 degrees and the upper eccentric region 142 having an eccentricity r14 with respect to the lower larger-diametered part 141. In the arrangement, the respective eccentricities are set to be equal to each other, that is, r11=r12=r13=r14.

A cam follower 128 to cooperate with both of the first and second eccentric cam parts 124 and 125 comprises a body 129 of a generally rectangular frame shape rounded at corners and an output shaft 130 vertically erected on the upper wall part of the body and, as required, intermediately once bent and again vertically extended. The body 129 defines a cavity 131 for fitting therein the first eccentric cam part 124, so that peripheral cam face of the cam part 124 abuts upper and lower wall projections 132 and 132a opposing in parallel relation to each other in the cavity 131 for extracting the linearly-reciprocating motion. The body 129 is also provided at the lower wall part with a forked interlocking arms 133 and 133a projecting away from the face gear 114 to abut the second eccentric cam part 125 on both lateral sides thereof for extracting the rotative reciprocating motion.

Referring next to the operation of the transmission gearing of this embodiment, a normal directional rotation of such driving source 111 as a reversible motor transmits its rotational force through an output shaft 112 of the driving source and the pinion 113 to the face gear 114 and also to the intermediate gear 135, upon which the both stoppers 126 and 140 of the first eccentric cam part 124 and intermediate gear 135 abut respectively one end wall of the guide recesses 121 and 143 of the eccentric cylindrical part 120 and second eccentric cam part 125 so that the first and second eccentric cam part 124 and 125 will be in interlocking engagement with the face gear 114 and intermediate gear 135, respectively. In this engagement, an eccentricity r15 of the first eccentric cam part 124 with respect to the axis of the pivot shaft 117 is made to be the sum of r11 and r12, i.e., 2r11 because r11=r12, while an eccentricity r16 of the second eccentric cam part 125 is made to be the difference between r13 and r14, i.e., zero so as to be concentrical with the axis of the gear 135. As a result, a linearly reciprocating motion component in the rotation of the first cam part 124 only is transmitted through the projections 132 and 132a to the cam follower 128 so that the output shaft 130 performs a vertically linear reciprocating motion with a stroke of 2r11 ×2=4r11.

When the driving source 111 is rotated in the reverse direction, on the other hand, the reverse rotation of the face gear 114 and intermediate gear 135 causes the stoppers 126 and 140 of the first eccentric cam part 124 and intermediate gear 135 to abut respectively the other end wall of the guide recesses 121 and 143, whereby the first and second eccentric cam parts 124 and 125 are brought into reverse directional interlocking with the face gear 114 and intermediate gear 135 to change over the eccentricity relationship by about 180 degrees. Under this condition, the eccentricity r15 of the first eccentric cam part 124 now becomes the difference between r11 and r12 to be zero, while the eccentricity r16 of the second eccentric cam part 125 becomes the sum of r13 and r14 to be thus 2r13 or 2r14. As a result, the second eccentric cam part 125 is rotated at the eccentricity r16=2r14 as held between the forked interlocking arms 133 and 133a so that only rotatively reciprocating component of this rotation is transmitted through the interlocking arms 133 and 133a to the cam follower 128 with a rotational angle of 2θ as seen in FIG. 13, whereby the output shaft 130 executes rotatively reciprocating motion in a range of the angle 2θ.

Other arrangement and operation of this embodiment are substantially the same as those in the embodiment of FIGS. 1 to 8.

What is claimed as my invention is:

1. A transmission gearing comprising:
   a reversible driving source,
   eccentric cam means including first and second cam parts driven in rotation by said driving source for selectively generating either of first and second differently directed motions,
   pivot shaft means for rotatably supporting said cam means,
   a cam follower having first and second contact faces abutting said first and second cam parts, respectively,
   positioning means interposed between said driving source and said cam means for positioning said cam means in a first orientation wherein one of said cam parts is concentric with said pivot shaft means and the other of said cam parts is eccentric with said pivot shaft means in a normal directional rotation of said cam means, and for positioning said cam means in a second orientation wherein said one cam part is eccentric with said pivot shaft means and said other cam part is concentric with said pivot shaft means in a reverse directional rotation of said cam means as driven by said reversible driving source, and
   means coupled to said cam follower for providing one of said first and second differently directed motions as an output obtained through the one of said contact faces which abuts the cam part positioned eccentric to the pivot shaft means.

2. A transmission gearing according to claim 1, wherein said positioning means comprises at least one gear directly driven by said driving source, and an eccentric cylindrical part fixedly coupled to said gear and operatively coupled to at least one of said first and second cam parts of said eccentric cam means.

3. A transmission gearing according to claim 2, wherein said gear is a face gear meshing with an output pinion of said driving source and having said eccentric cylindrical part projecting from a face of said face gear, said cylindrical part having an axial bore eccentric with respect to the axis of the cylindrical part and receiving therethrough said pivot shaft means, at least said first cam part of said eccentric cam means being rotatably mounted on said eccentric cylindrical part which extends through an axial hole in the first cam part so as to be eccentric with respect to the axis of the first cam part.

4. A transmission gearing according to claim 3, wherein said axial bore of said eccentric cylindrical part is of an eccentricity equal to that of said axial hole of said first cam part.

5. A transmission gearing according to claim 3, wherein said cam follower includes a cavity for fitting therein said first cam part, opposing edges of said cavity forming one of said contact faces contacting the first cam part for extracting a linearly reciprocating motion component as one of said two differently directed motions upon eccentric rotation of the first cam part.

6. A transmission gearing according to claim 5, wherein said second cam part of said eccentric cam means is integrally coupled to said first cam part to be eccentric thereto, and said cam follower includes arms extended to be positioned on both sides of the second cam part to come into contact therewith for extracting a rotatively reciprocating motion component as the other one of said differently directed motions upon eccentric operation of the second cam part.

7. A transmission gearing according to claim 6, wherein eccentricities of said axial bore of said eccentric cylindrical part and said axial hole of said first cam part are respectively made equal to an eccentricity between said second cam part and the first cam part.

8. A transmission gearing according to claim 6, wherein said positioning means further comprises a guide recess provided in one of said eccentric cylindrical part and said eccentric cam means to extend in a predetermined angular range, and a stopper provided on the other of said eccentric cylindrical part and said eccentric cam means to be engaged in said guide recess for interlocking the face gear with the eccentric cam means in one of said normal and reverse directional driving of said driving source.

9. A transmission gearing according to claim 8, wherein said guide recess and stopper are arranged such that said cam follower follows an eccentric rotation of said first cam part in said normal directional driving of said driving source and an eccentric rotation of said second cam part in said reverse directional driving of the driving source, respectively.

10. A transmission gearing according to claim 1, wherein said second cam part is tapered along a portion of its peripheral surface where the respective said contact face of said cam follower abuts.

11. A transmission gearing according to claim 5, wherein said first and second cam parts of said eccentric cam means are provided separately to be respectively driven through said output pinion of said driving source, said first cam part being fitted in said cavity of said cam follower for said extraction of said linearly reciprocating motion component, and said cam follower includes arms extended to be positioned on both sides of the second cam part to come into contact therewith for extracting the rotatively reciprocating motion component upon eccentric operation of the second cam part.

12. A transmission gearing according to claim 1, wherein said first motion comprises reciprocal motion, and said second motion comprises oscillatory motion.

13. A transmission gearing according to claim 1, wherein said first and second motions are in different planes.

14. A transmission gearing according to claim 1, wherein said first and second cam parts are rotatable about a common axis.

15. A transmission gearing according to claim 1, wherein said first and second cam parts are rotatable about first and second mutually angled axes, respectively.

* * * * *